United States Patent
Imai et al.

(10) Patent No.: US 6,791,305 B2
(45) Date of Patent: Sep. 14, 2004

(54) SWITCHING POWER SUPPLY CONTROL CIRCUIT AND SWITCHING POWER SUPPLY USING SAME

(75) Inventors: Takakazu Imai, Chuo-ku (JP); Takeshi Uematsu, Chuo-ku (JP)

(73) Assignee: TDK Corporation, Tokyo (JP)

( * ) Notice: Subject to any disclaimer, the term of this patent is extended or adjusted under 35 U.S.C. 154(b) by 27 days.

(21) Appl. No.: 10/374,585

(22) Filed: Feb. 24, 2003

(65) Prior Publication Data

US 2003/0160598 A1 Aug. 28, 2003

(30) Foreign Application Priority Data

Feb. 28, 2002 (JP) ...................................... 2002-053009

(51) Int. Cl.[7] .............................................. G05F 1/40
(52) U.S. Cl. ...................................................... 323/283
(58) Field of Search ................................ 323/268, 271, 323/282, 283, 285, 286, 287

(56) References Cited

U.S. PATENT DOCUMENTS

| | | | | |
|---|---|---|---|---|
| 3,970,919 A | * | 7/1976 | Butcher | 323/283 |
| 5,883,501 A | * | 3/1999 | Arakawa | 323/222 |
| 6,137,188 A | | 10/2000 | Mitchell et al. | 307/29 |
| 6,204,651 B1 | * | 3/2001 | Marcus et al. | 323/283 |
| 6,275,019 B1 | * | 8/2001 | Fisher | 323/288 |
| 6,275,364 B1 | | 8/2001 | Voit | 361/18 |

FOREIGN PATENT DOCUMENTS

WO    WO 00/07414    2/2000

\* cited by examiner

*Primary Examiner*—Matthew V. Nguyen
(74) *Attorney, Agent, or Firm*—Seed IP Law Group PLLC

(57) ABSTRACT

This invention provides a switching power supply control circuit that can switch the output voltage with high precision and at high speed. The control circuit comprises an A/D converter 31 that generates a output voltage digital value D1 indicating the actual output $V_o$ in response to clock signal CLK1, a reference voltage generating circuit 32 that generates a reference voltage digital value D2 that indicated the target value of the output voltage in response to clock signal CLK2, a subtracter 33 that compares the output voltage digital value D1 and reference voltage digital value D2 and generates an error voltage digital value D3 based thereupon, a latch circuit 34 that reads the error voltage digital value D3 in response to clock signal CLK3 and controls the operation of the switching circuit block 10 based thereupon and an arithmetic circuit 35. The phases of the clock signal CLK1 and the clock signal CLK3 are substantially shifted and the phases of the clock signal CLK2 and the clock signal CLK3 are substantially shifted.

20 Claims, 4 Drawing Sheets

SWITCHING POWER SUPPLY CONTROL CIRCUIT AND SWITCHING POWER SUPPLY USING SAME

BACKGROUND OF THE INVENTION

The present invention relates to a switching power supply control circuit and a switching power supply using same, and particularly to a control circuit that performs digital control of a switching power supply and a switching power supply using same.

DESCRIPTION OF THE PRIOR ART

Switching power supplies are conventionally used in computers, home electronics, automobiles and various other products. Typical switching power supplies are units (DC/DC converters) that first use switching circuits to convert a DC input to AC and then convert it back to DC, and thus it is possible to obtain DC output of a different voltage than the input voltage.

With such a switching power supply, a control circuit is used to detect the output voltage and the switching operation is controlled by the switching circuit based thereupon. Thereby, the switching power supply supplies a stable operating voltage to the load to be driven.

However, the clock speed of the central processing unit (CPU) or digital signal processor (DSP) used in recent years has greatly increased, and thus the power consumption of the CPU or DSP has become much larger than in the past. Against this background, reducing CPU and DSP power consumption has recently become a serious problem, and as one method of doing this, technologies that vary the operating voltage required depending on the operating state have been proposed. Accordingly, switching power supplies for supplying power to these types of CPU or DSP must be able to switch their output voltage quickly.

On the other hand, in order to achieve this low power consumption, CPU and DSP operating voltages are becoming lower and lower every year, and accordingly the output voltage margin tolerated in the switching power supply has become extremely small.

Against this background, switching power supplies that are able to switch the output voltage with high precision and at high speed have become desirable in recent years.

SUMMARY OF THE INVENTION

It is therefore an object of the present invention to provide a switching power supply control circuit that can switch the output voltage with high precision and at high speed.

Another object of the present invention is to provide a switching power supply that can switch the output voltage with high precision and at high speed.

An object of the present invention is thus achieved by a control circuit for performing digital control of a switching power supply equipped with a switching circuit block, comprising: a first means that generates an output voltage digital value that indicates the actual output voltage of the switching power supply in response to a first clock signal, a second means that generates a reference voltage digital value that indicates a target value of the output voltage of the switching power supply in response to a second clock signal, a third means that compares the output voltage digital value and the reference voltage digital value and generates an error voltage digital value based thereupon, and a fourth means that reads the error voltage digital value in response to a third clock signal and controls the operation of the switching circuit block based thereupon, wherein: the phases of the first clock signal and the third clock signal are substantially shifted and the phases of the second clock signal and the third clock signal are substantially shifted.

In a preferred embodiment of the present invention, the phase difference between the first clock signal and the third clock signal is greater than the sum of the operating time delay of the first means and the operating time delay of the third means.

In a further preferred embodiment of the present invention, the phase difference between the second clock signal and the third clock signal is greater than the sum of the operating time delay of the second means and the operating time delay of the third means.

In a further preferred embodiment of the present invention, the frequencies of the first through third clock signals essentially agree.

In a further preferred embodiment of the present invention, the phases of the first clock signal and the second clock signal essentially agree.

In a further preferred embodiment of the present invention, the second means comprises a plurality of memories that contain mutually different digital values, and a multiplexer that selects one of the plurality of memories in response to the second clock signal and outputs the digital value contained in the selected memory as the reference voltage digital value.

In a still further preferred embodiment of the present invention, the second means comprises a register that reads a digital value in response to the second clock signal and outputs this digital value as the reference voltage digital value.

In a further preferred embodiment of the present invention, the first means is an A/D converter and the third means is a logic circuit.

An object of the present invention is also achieved by switching power supply comprising: a switching circuit block that converts a DC input voltage to AC, an output circuit block that receives the AC output from the switching circuit block and converts it to DC, and a control circuit that controls the operation of the switching circuit block so that the output voltage of the output circuit block is a certain value, wherein the switching circuit block comprises: a first means that generates an output voltage digital value that indicates the actual output voltage of the switching power supply in response to a first clock signal, a second means that generates a reference voltage digital value that indicates a target value of an output voltage of the switching power supply in response to a second clock signal, a third means that compares the output voltage digital value and the reference voltage digital value and generates an error voltage digital value based thereupon, and a fourth means that reads the error voltage digital value in response to a third clock signal and controls the operation of the switching circuit block based thereupon, and wherein: the phases of the first clock signal and the third clock signal are substantially shifted and the phases of the second clock signal and the third clock signal are substantially shifted.

In a preferred embodiment of the present invention, the phase difference between the first clock signal and the third clock signal is greater than the sum of the operating time delay of the first means and the operating time delay of the third means, and the phase difference between the second clock signal and the third clock signal is greater than the sum of the operating time delay of the second means and the operating time delay of the third means.

With the present invention having the aforementioned constitution, it is possible to switch the output voltage with high precision and at high speed.

The above and other objects and features of the present invention will become apparent from the following description made with reference to the accompanying drawings.

DESCRIPTION OF THE PREFERRED EMBODIMENTS

Here follows a detailed description of a preferred embodiment of the present invention made with reference to the appended drawings.

Figure 1:
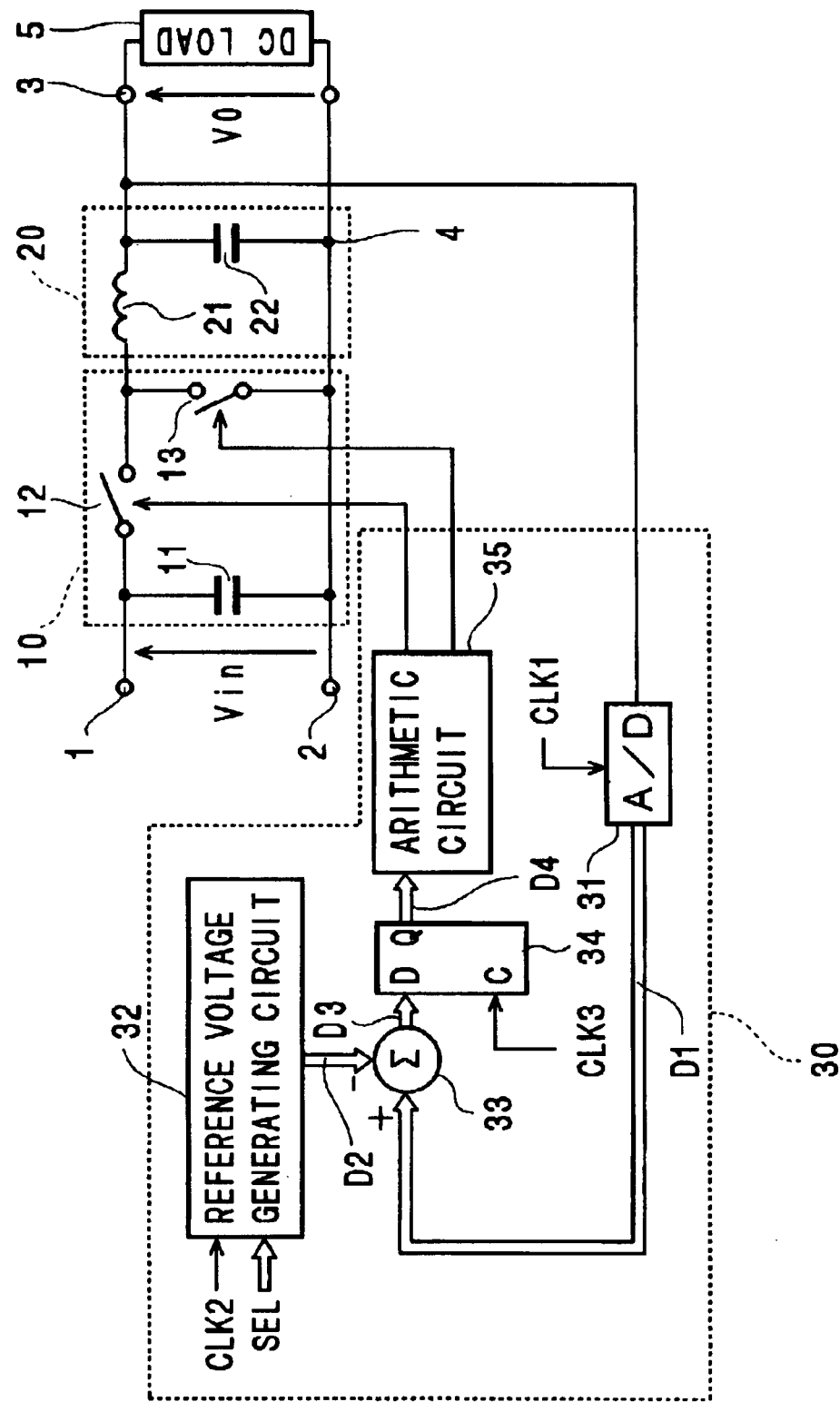
FIG. 1 is a circuit diagram of the switching power supply according to a preferred embodiment of the present invention.

FIG. 1 is a circuit diagram of the switching power supply according to a preferred embodiment of the present invention.

As shown in FIG. 1, the switching power supply according to this embodiment is a unit that steps down the DC input voltage $V_{in}$ supplied between input power terminals 1 and 2 and generates the DC output voltage $V_o$ which is supplied between the output power terminals 3 and 4, consisting of a switching circuit block 10, output circuit block 20 and control circuit block 30. A CPU, DSP or other DC load 5 is connected between output power terminals 3 and 4.

The switching circuit block 10 is a circuit for converting the DC input voltage $V_{in}$ supplied between the input power terminals 1 and 2 to AC, consisting of an input capacitor 11 and switch elements 12 and 13. The input capacitor 11 is connected between the input power terminals 1 and 2 and has the role of stabilizing the input voltage $V_{in}$. In addition, switch element 12 is connected in series between the input capacitor 11 and the output circuit block 20, while switch element 13 is connected in parallel between switch element 12 and the output circuit block 20. These switch elements 12 and 13 are alternately turned on with a stipulated dead time under the control of the control circuit block 30.

The output circuit block 20 is a circuit for receiving the AC output from the switching circuit block 10 and converting this to DC, consisting of an output reactor 21 and an output capacitor 22. The output reactor 21 is connected in series between the switching circuit block 10 and output power terminal 3 while the output capacitor 22 is connected between the output power terminals 3 and 4.

The control circuit block 30 is a digital control circuit consisting of an analog-to-digital (A/D) converter 31, reference voltage generating circuit 32, subtracter 33, latch circuit 34 and arithmetic circuit 35. The A/D converter 31 is a circuit that receives the output voltage $V_o$ appearing at output power terminal 3 and converts this to a digital value in response to the clock signal CLK1. In this Specification, the digital value which is the output of the A/D converter 31 is called the "output voltage digital value D1." The reference voltage generating circuit 32 is a circuit that generates a digital value corresponding to the target value of the output voltage $V_o$, with details to follow, but in this Specification, the output value of the reference voltage generating circuit 32 is called the "reference voltage digital value D2." The subtracter 33 is a logic circuit (logic gate circuit) that subtracts the reference voltage digital value D2 from output voltage digital value D1, and in this Specification, the output is called the "error voltage digital value D3." The latch circuit 34 is a multi-bit latch circuit that latches the error voltage digital value in response to the clock signal CLK3, and in this Specification, this output is called the "control digital value D4."

The arithmetic circuit 35 is a circuit that receives the control digital value D4 supplied from latch circuit 34 and controls the switching operations of the switch elements 12 and 13 based thereupon. Specifically, the greater the control digital value D4 is in the positive direction, namely the greater the output voltage digital value D1 is in excess of the reference voltage digital value D2, the duty of switch element 12 is controlled to be smaller (the duty of switch element 13 is controlled to be larger). Conversely, the greater the control digital value D4 is in the negative direction, namely the greater the reference voltage digital value D2 is in excess of the output voltage digital value D1, the duty of switch element 12 is controlled to be larger (the duty of switch element 13 is controlled to be smaller). Thereby, the actual output voltage $V_o$ is stabilized to the value indicated by the reference voltage digital value D2.

Figure 2:
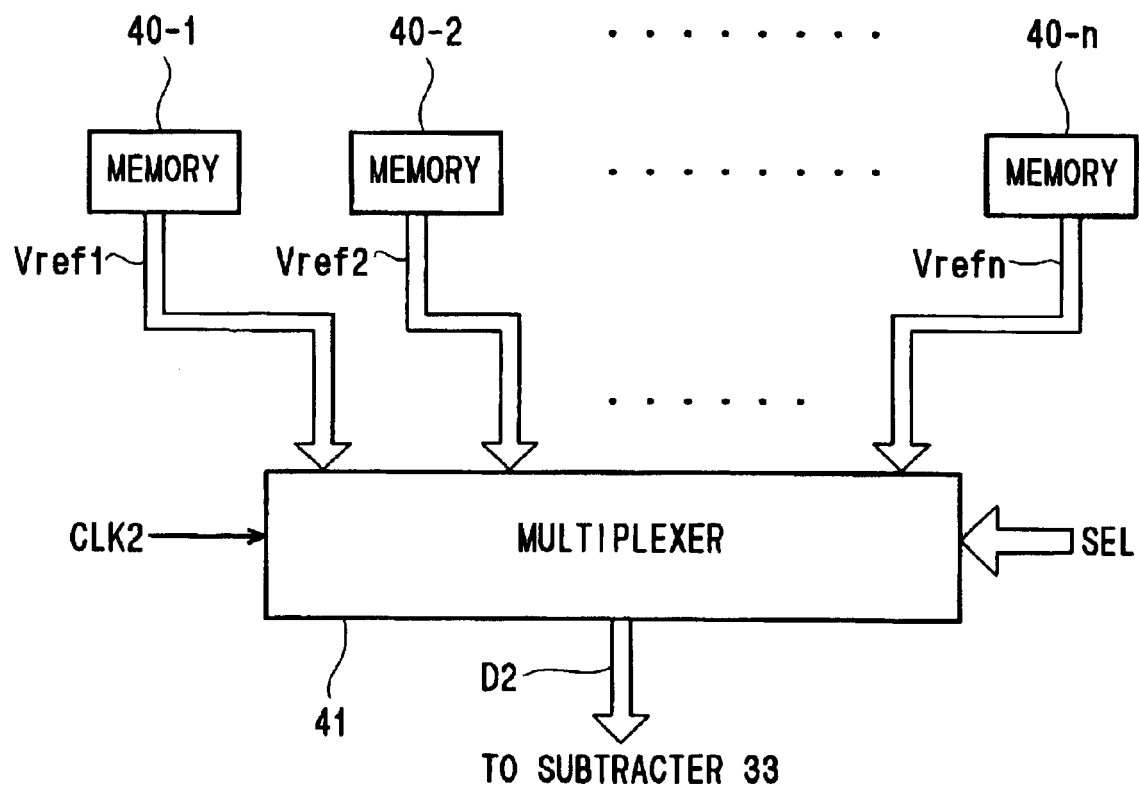
FIG. 2 is a circuit diagram showing one example of the reference voltage generating circuit 32.

FIG. 2 is a circuit diagram showing one example of the reference voltage generating circuit 32.

As shown in FIG. 2, the reference voltage generating circuit 32 consists of a plurality of memories 40-1 through 40-n and a multiplexer 41. The memories 40-1 through 40-n each contain a digital value (target digital value) corresponding to a different output voltage $V_o$. Here, a different output voltage $V_o$ refers to the various operating voltages when DC load 5 demands variable operating voltages. For example, if the DC load 5 demands three different operating voltages of 1.0 V, 1.3 V and 1.5 V, then target digital values corresponding to 1.0 V, 1.3 V and 1.5 V are stored in memories 40-1 through 40-3, respectively. Note that the target digital values are set to the same values as the output voltage digital value D1 to be obtained from the A/D converter 31 in the case that the actual output voltage $V_o$ agrees with the target value. The target digital values $V_{ref1}$ through $V_{refn}$ stored in these memories 40-1 through 40-n are each supplied to the multiplexer 41.

The multiplexer 41 is a circuit that receives the target digital values $V_{ref1}$ through $V_{refn}$, clock signal CLK2 and selection signal SEL and, synchronized to the clock signal CLK2, supplies the target digital value (one of $V_{ref1}$ through $V_{refn}$) indicated by the selection signal SEL to the subtracter 33 as the reference voltage digital value D2. This selection signal SEL is a signal given by the DC load 5 in order to specify the output voltage $V_o$ to be supplied.

Note that while this will be described in detail below, the clock signals CLK1, CLK2 and CLK3 preferably agree with each other in frequency, and the phases of at least clock signals CLK1 and CLK3 and the phases of clock signals CLK2 and CLK3 are essentially shifted.

Here follows a description of the switching operation of the output voltage $V_o$ by means of the switching power supply of this Embodiment.

Figure 3:
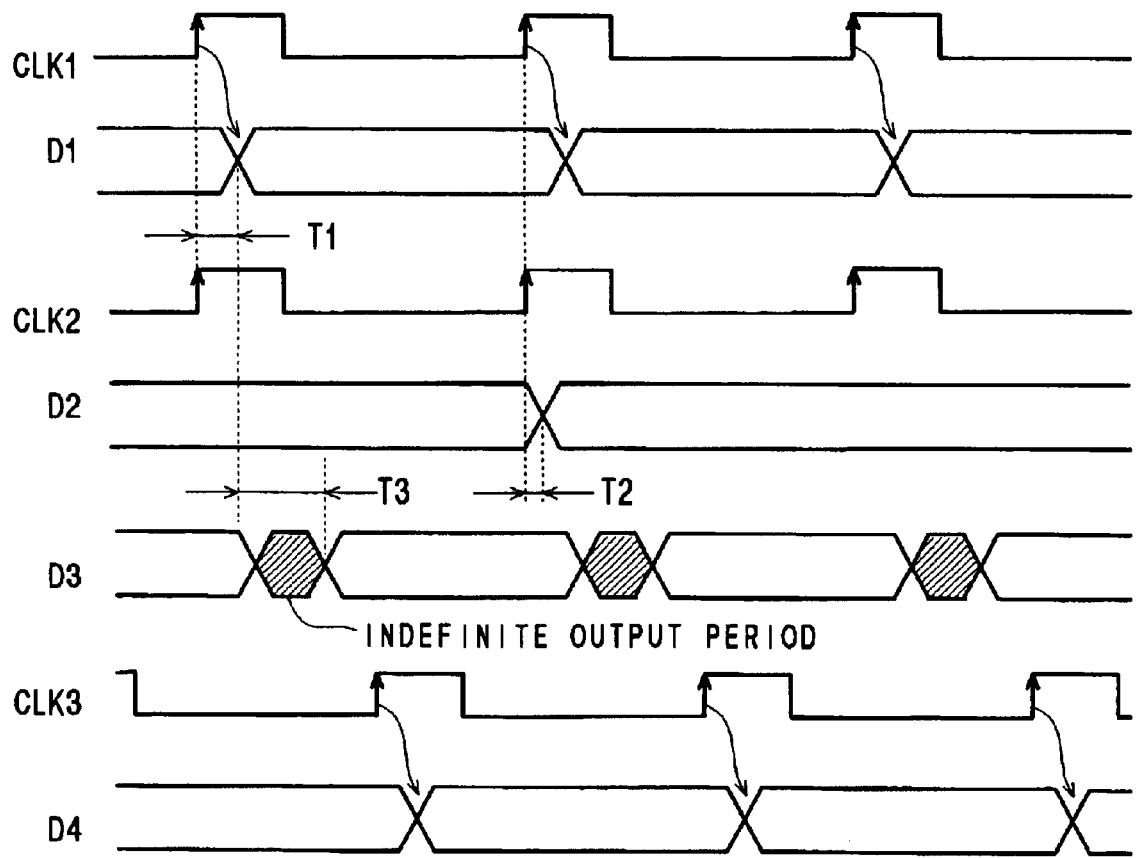
FIG. 3 is a timing chart showing the switching operation of the output voltage $V_o$.

FIG. 3 is a timing chart showing the switching operation of the output voltage $V_o$. In this Embodiment, the clock signals CLK1, CLK2 and CLK3 agree with each other in frequency, the phases of clock signals CLK1 and CLK2 agree, and the phases of clock signals CLK1 and CLK2 are shifted by approximately one-half cycle from CLK3.

As shown in FIG. 3, when the output voltage $V_o$ fluctuates, the output voltage digital value D1 changes in response to the rising edge of clock signal CLK1, but because the A/D converter 31 requires a certain amount of conversion time, a time delay T1 is present between the rising edge of the clock signal CLK1 and the output voltage digital value D1. In other words, when the output voltage $V_o$ fluctuates, the output voltage digital value D1 changes once the time delay T1 elapses after the rise of the clock signal CLK1.

Similarly, when the selection signal SEL changes, the reference voltage digital value D2 changes in response to the rising edge of the clock signal CLK2, but because the multiplexer 41 requires a certain amount of switching time, a time delay T2 is present between the rising edge of the clock signal CLK2 and the reference voltage digital value D2. In other words, when the selection signal SEL changes, the reference voltage digital value D2 changes once the time delay T2 elapses after the rise of the clock signal CLK2.

Because the subtracter 33 performs operations by receiving the output voltage digital value D1 and reference voltage digital value D2 which change with this timing, as shown in FIG. 3, the operations can be performed normally once the clock signals CLK1 and CLK2 rise only after both the output voltage digital value D1 and reference voltage digital value D2 are stabilized (once the longer of the time delays T1 or T2 (T1 in FIG. 3) elapses). Accordingly, once both the output voltage digital value D1 and reference voltage digital value D2 are stabilized, the error voltage digital value D3 is indefinite until a certain time required for operation (the time delay T3) elapses (the indefinite output period).

For this reason, the error voltage digital value D3 is stabilized after the longer of the time delays T1 or T2+time delay T3 elapses after the clock signals CLK1 and CLK2 rise. Accordingly, if the phase shift of the clock signal CLK3 with respect to clock signals CLK1 and CLK2 is set larger than the longer of the time delays T1 or T2+ time delay T3, regardless of the timing on which the selection signal SEL supplied from the DC load 5 changes, the latch circuit 34 will not perform its latch during this indefinite period of the error voltage digital value D3, and a smooth switching of the output voltage $V_o$ can be achieved. To wit, it is possible to achieve high-precision and high-speed switching of the output voltage $V_o$ without disturbance of the output voltage $V_o$ by the order to switch the output voltage $V_o$.

Figure 4:
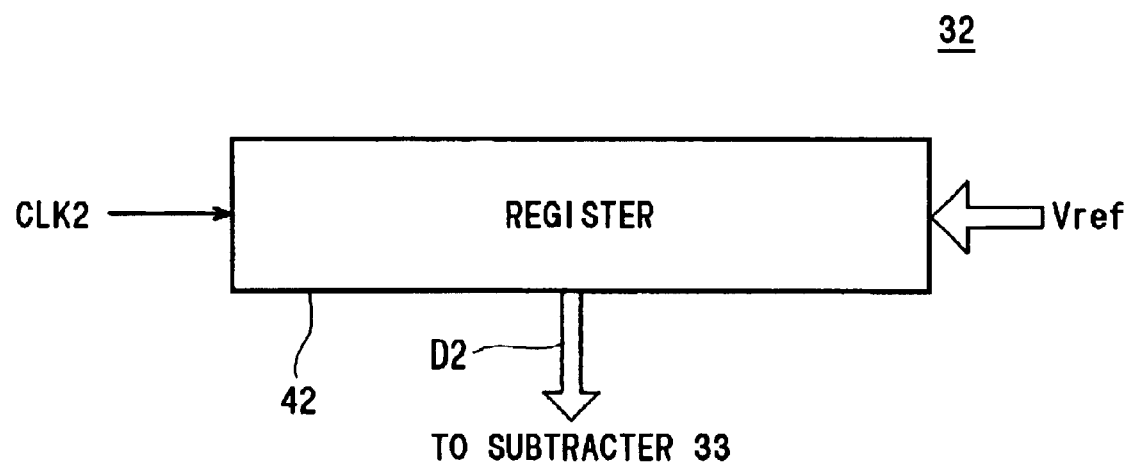
FIG. 4 is a circuit diagram showing another example of the reference voltage generating circuit 32.

FIG. 4 is a circuit diagram showing another example of the reference voltage generating circuit 32.

As shown in FIG. 4, the reference voltage generating circuit 32 of this Embodiment consists of a register 42 that receives the target digital value $V_{ref}$ in response to the clock signal CLK2. This target digital value $V_{ref}$ is a signal given by the DC load 5, for example, and directly indicates as a digital value the value of the output voltage $V_o$ to be supplied.

Even in the case of using a reference voltage generating circuit 32 having such a constitution, when the target digital value $V_{ref}$ changes, a certain amount of time (time delay T2') is required before the reference voltage digital value D2 is stabilized, but by setting the shift in the phase of the clock signal CLK3 with respect to clock signals CLK1 and CLK2 to a value larger than the longer of time delays T1 or T2'+ time delay T3, regardless of the timing at which the target digital value $V_{ref}$ changes, it is possible to achieve high-precision and high-speed switching of the output voltage $V_o$ without disturbance of the output voltage $V_o$.

The present invention is in no way limited to the aforementioned embodiments, but rather various modifications are possible within the scope of the invention as recited in the claims, and naturally these modifications are included within the scope of the invention.

For example, in the Embodiment described above, the phases of clock signals CLK1 and CLK2 agree, but in the present invention it is not mandatory for these phases to agree. Rather, these phases may be shifted from each other as long as the phase shift between clock signal CLK1 and clock signal CLK3 is larger than the time delay T1+T3 and the phase shift between clock signal CLK2 and clock signal CLK3 is larger than the time delay T2 (T2')+T3. However, if the phases of clock signal CLK1 and CLK2 agree as in the aforementioned Embodiment and also the frequencies of the two agree, it is possible to use the same clock signal for both clock signals CLK1 and CLK2, so the circuit configuration can be simplified.

In addition, in the Embodiment described above, the frequencies of clock signals CLK1 through CLK3 agree, but in the present invention it is not mandatory for these frequencies to agree. Rather, these frequencies may be different as long as the phase shift between clock signal CLK1 and clock signal CLK3 and the phase shift between clock signal CLK2 and clock signal CLK3 are maintained. For example, as long as the aforementioned phase shift is maintained, the frequency of the clock signal CLK2 may be set to ½ of that of clock signals CLK1 and CLK3. However, if the frequencies of clock signals CLK1 through CLK3 agree as in the aforementioned Embodiment, the aforementioned phase shift can be most easily maintained.

Moreover, in the switching power supply according to the various Embodiments described above, a so-called buck converter is used as the switching circuit block 10, but the present invention is in no way limited to this so it can also be applied to a switching power supply that uses another kind of switching circuit. In addition, in the switching power supply according to the various Embodiments described above, the switching circuit block 10 and output circuit block 20 are not insulated, but the present invention is in no way limited to this so it can also be applied to a type of switching power supply that is insulated using a transformer.

As described above, with the present invention, it is possible to switch the output voltage $V_o$ with high precision and at high speed.

What is claimed is:

1. A control circuit for performing digital control of a switching power supply equipped with a switching circuit block comprising:

a first means that generates an output voltage digital value that indicates an actual output voltage of the switching power supply in response to a first clock signal, a second means that generates a reference voltage digital value that indicates a target value of an output voltage of the switching power supply in response to a second clock signal, a third means that compares the output voltage digital value and the reference voltage digital value and generates an error voltage digital value based thereupon, and a fourth means that reads the error voltage digital value in response to a third clock signal and controls an operation of the switching circuit block based thereupon, wherein:

phases of the first clock signal and the third clock signal are substantially shifted and phases of the second clock signal and the third clock signal are substantially shifted.

2. The control circuit as claimed in claim 1, wherein a phase difference between the first clock signal and the third clock signal is greater than a sum of an operating time delay of the first means and an operating time delay of the third means.

3. The control circuit as claimed in claim 1, wherein a phase difference between the second clock signal and the third clock signal is greater than a sum of an operating time delay of the second means and an operating time delay of the third means.

4. The control circuit as claimed in claim 2, wherein a phase difference between the second clock signal and the third clock signal is greater than a sum of an operating time delay of the second means and an operating time delay of the third means.

5. The control circuit as claimed in claim 1, wherein frequencies of the first through third clock signals essentially agree.

6. The control circuit as claimed in claim 1, wherein the phases of the first clock signal and the second clock signal essentially agree.

7. The control circuit as claimed in claim 1, wherein the second means comprises a plurality of memories that contain mutually different digital values, and a multiplexer that selects one of the plurality of memories in response to the second clock signal and outputs the digital value contained in the selected memory as the reference voltage digital value.

8. The control circuit as claimed in claim 1, wherein the second means comprises a register that reads a digital value in response to the second clock signal and outputs this digital value as the reference voltage digital value.

9. The control circuit as claimed in claim 1, wherein the first means is an A/D converter and the third means is a logic circuit.

10. A switching power supply comprising:
    a switching circuit block that converts a DC input voltage to AC,
    an output circuit block that receives the AC output from the switching circuit block and converts it to DC, and
    a control circuit that controls an operation of the switching circuit block so that an output voltage of the output circuit block is a certain value, wherein
    the switching circuit block comprises:
    a first means that generates an output voltage digital value that indicates an actual output voltage of the switching power supply in response to a first clock signal,
    a second means that generates a reference voltage digital value that indicates a target value of an output voltage of the switching power supply in response to a second clock signal,
    a third means that compares the output voltage digital value and the reference voltage digital value and generates an error voltage digital value based thereupon, and
    a fourth means that reads the error voltage digital value in response to a third clock signal and controls the operation of the switching circuit block based thereupon, and wherein:
    phases of the first clock signal and the third clock signal are substantially shifted and phases of the second clock signal and the third clock signal are substantially shifted.

11. The switching power supply as claimed in claim 10, wherein a phase difference between the first clock signal and the third clock signal is greater than a sum of an operating time delay of the first means and an operating time delay of the third means, and a phase difference between the second clock signal and the third clock signal is greater than a sum of an operating time delay of the second means and an operating time delay of the third means.

12. A control circuit for performing digital control of a switching power supply equipped with a switching circuit block, comprising:
    a first generator that generates a first digital value that indicates an actual output voltage of the switching power supply in response to a first clock signal;
    a second generator that generates a second digital value that indicates a target value of an output voltage of the switching power supply in response to a second clock signal;
    a comparator that compares the first digital value and the second voltage digital value and generates a third digital value based thereupon;
    a latch circuit that latches the third digital value in response to a third clock signal; and
    an arithmetic circuit that controls an operation of the switching circuit block based on a content of the latch circuit, wherein:
    phases of the first clock signal and the third clock signal are substantially shifted and phases of the second clock signal and the third clock signal are substantially shifted.

13. The control circuit as claimed in claim 12, wherein a phase difference between the first clock signal and the third clock signal is greater than a sum of an operating time delay of the first generator and an operating time delay of the comparator.

14. The control circuit as claimed in claim 12, wherein a phase difference between the second clock signal and the third clock signal is greater than a sum of an operating time delay of the second generator and an operating time delay of the comparator.

15. The control circuit as claimed in claim 13, wherein a phase difference between the second clock signal and the third clock signal is greater than a sum of an operating time delay of the second generator and an operating time delay of the comparator.

16. The control circuit as claimed in claim 12, wherein frequencies of the first through third clock signals essentially agree.

17. The control circuit as claimed in claim 12, wherein the phases of the first clock signal and the second clock signal essentially agree.

18. The control circuit as claimed in claim 12, wherein the second generator comprises a plurality of memories that contain mutually different digital values, and a multiplexer that selects one of the plurality of memories in response to the second clock signal and outputs the digital value contained in the selected memory as the second digital value.

19. The control circuit as claimed in claim 12, wherein the second generator comprises a register that reads a digital value in response to the second clock signal and outputs this digital value as the second digital value.

20. The control circuit as claimed in claim 12, wherein the first generator is an A/D converter and the comparator is a logic circuit.

* * * * *